Oct. 2, 1956     M. S. GUTHRIE     2,764,949
ROPE CLUTCH
Filed Sept. 13, 1951
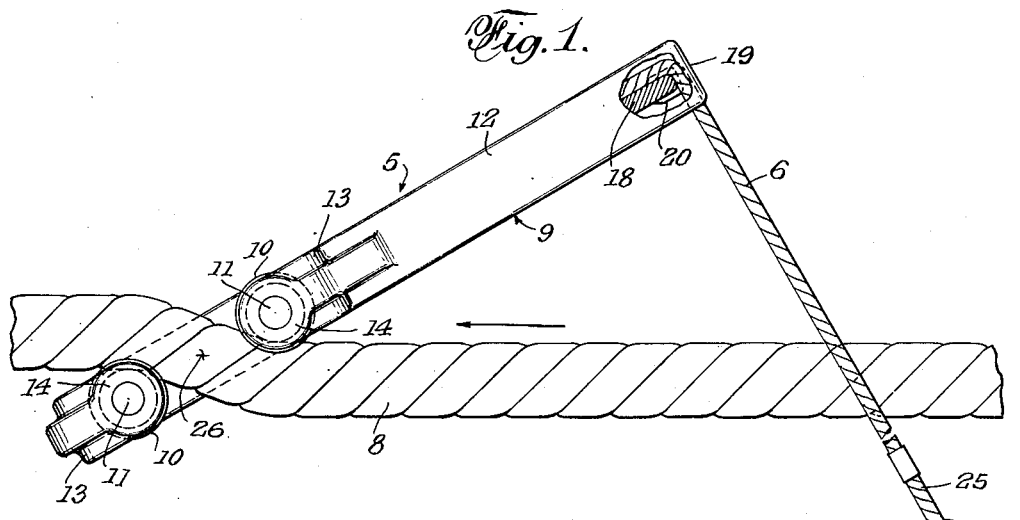
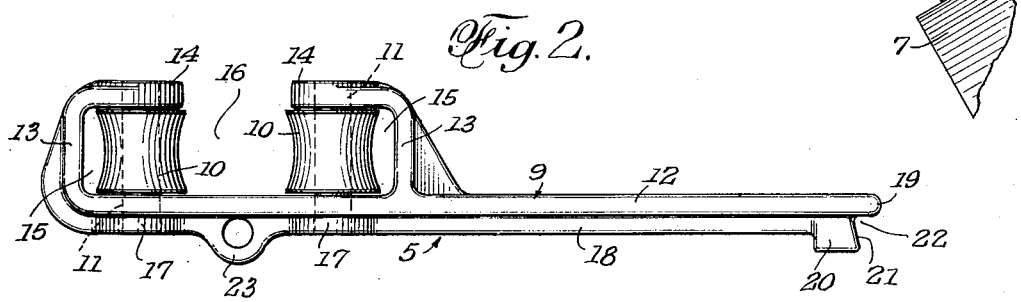
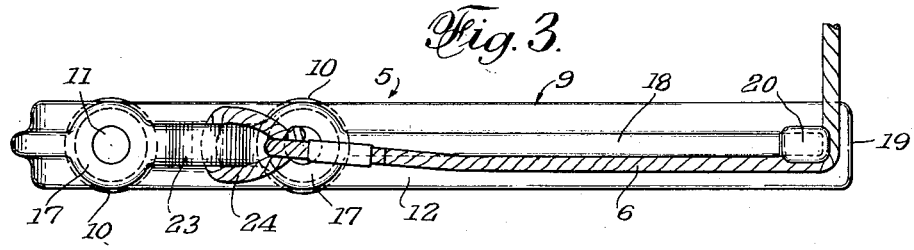
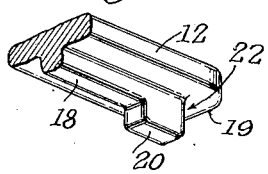 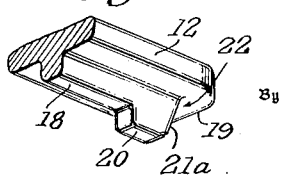
Inventor
MYRON S. GUTHRIE
By C. G. Stratton
Attorney

United States Patent Office 2,764,949
Patented Oct. 2, 1956

2,764,949

ROPE CLUTCH

Myron S. Guthrie, Los Angeles, Calif.

Application September 13, 1951, Serial No. 246,391

11 Claims. (Cl. 104—229)

This invention relates to a clutch for gripping a rope or the like, and deals more particularly with a clutch for gripping the tow rope of a ski-run hoist.

An object of the present invention is to provide an extremely simple, yet effective and durable clutch device for the purpose intended, and one that has easy facility of engagement with the disengagement from a tow rope.

Another object of the invention is to provide a rope clutch that effects sure gripping by forming an offset or kink in the rope, whereby the gripping force is increased as the degree of offset is increased.

Another object of the invention is to provide a clutch device, as indicated, that embodies an elongated flexible element, such as a cord or cable, it being contemplated to apply the weight of the person being towed on said cord or cable to, thereby, create the clutching force of the device.

The invention also has for its objects to provide such means that are positive in operation, convenient in use, easily installed in a working position and easily disconnected therefrom, economical of manufacture, relative simple, and of general superiority and serviceability.

The invention also comprises novel details of construction and novel combinations and arrangements of parts, which will more fully appear in the course of the following description. However, the drawing merely shows and the following description merely describes one embodiment of the present invention, which is given by way of illustration or example only.

In the drawing, like reference characters designate similar parts in the several views.

Fig. 1 is a side elevational view of a rope clutch according to the invention and shown in operative position.

Fig. 2 is a slightly enlarged top plan view of said clutch.

Fig. 3 is a side elevational view, showing the manner of connection of the clutch cord, the view showing the side opposite that shown in Fig. 1.

Figs. 4 and 5 are fragmentary perspective views of modifications.

The rope clutch that is illustrated comprises, generally, an elongated clutch element 5, and a clutch cord 6 attached thereto and adapted to be attached to a belt 7 or other means whereby the weight of a person being towed by tow rope 8 is effective, through cord 6, to non-slidably couple element 5 and rope 8.

Clutch element 5 preferably comprises a cast elongated body 9, and a pair of rope-engaging rollers 10 carried by said body on spaced parallel pins or stub shafts 11.

The body 9 is formed with a generally flat bar-like main elongated portion 12 from one side of which a pair of lateral projections 13 extend, inwardly directed ears 14 on the ends of said extensions defining oppositely facing recesses 15 in which rollers 10 are positioned. The projections 13, ears 14 and rollers 10 are spaced a distance substantially greater than the diameter of rope 8 to enable lateral application of the clutch by freely admitting the rope into space 16 between rollers 10. Ears 14 and the portions 17 of body bar 9 that are opposite thereto constitute laterally spaced bearings for pins 11 and it is preferred that said pins be press-fitted in said bearings and that rollers 10 freely revolve on said pins.

On the side opposite to projections 13, body bar 9 is provided with a longitudinal rib 18 positioned centrally of said bar and extending to, but somewhat short of the free end 19 of the bar. Adjacent said free end 19, rib 18 is enlarged to form a lug 20 and the end and side faces of said lug are directed at an acute angle to the plane of bar 9 as suggested at 21, thereby providing lug 20 with undercut seats 22, since the projecting end of lug 20 is larger than is the portion thereof that joins bar 9.

The modification shown in Fig. 4 shows the end and side faces of lug 20 to be normal to the plane of bar 12, seats 22, thereby being square or angular. The modification of Fig. 5 shows the end face 21a of lug 20 at an obtuse angle to bar 12, seat 22 at the end being accordingly obtuse.

Between the bearings in portions 17 of bar 9, the clutch is provided with an eye 23 aligned with and somewhat thicker than rib 18.

The rollers 10 have concave peripheral surfaces substantially as shown, to obviate lateral displacement when engaged with tow rope 8.

Clutch cord 6, at one end 24, is affixed to eye 23, and at the other end 25, to belt 7 or the like, said cord being of suitable length to allow adjustability thereof according to the height of the tow rope above the ground and the size of the person wearing belt 7. Cord 6 also serves to hold the clutch captive.

In use, the clutch element 5, from the side of tow rope 8 opposite to the person to be towed, is applied in a substantially vertical position, with end 19 up, so that the tow rope is running, in the direction shown, between rollers 10. Cord 6 is trained alongside of rib 18 and around undercut projection 20. As element 5 is allowed to tilt to bring the rollers into engagement with the tow rope, said element assumes a rearward angle as shown in Fig. 1, with the free end of cord 6 on the forward side of the tow rope. The rollers, seeking to swing around a point 26 between them, bear from opposite sides, on the rope and form an offset or kink therein, as in Fig. 1. The sharper the offset the greater the frictional resistance created and element 5 is firmly clutched to the rope so long as a pull is imparted to end 25 of cord 6. The person being towed creates such a pull and a hand on cord 6 may be employed to steady said cord and assure retention of the same in seats 22 of each form shown. Since tow rope 8 is in continuous motion, the engagement of cord 6 over projection 20 enables quick release of the clutch by slipping said cord laterally off said projection. This feature is important not only when deliberate disengagement of the clutch is desired, but when emergency release is necessary.

The choice of the form of seats 22 may be a personal one and be related to the compressibility of cord 6. The undercut seats afford firmer retention of the cord, while the obtuse seat of Fig. 5 allows for more ready displacement and release from lug 20 when the present clutch is to be disengaged from the tow rope. The form of Fig. 4 represents a compromise between the other two forms. In any case, the three forms each essentially comprises a bright-retaining means in the manner above indicated.

Because the clutch element 5 is symmetrical on its longitudinal center line, the same may, as effectively be used with the person being towed on the opposite side of the tow rope, or, for children or people of quite small stature, the clutch may be applied with end 19 down. In other words, cord 6 may operatively be positioned on either side of rib 18, depending on the particular manner of applying the clutch to the tow rope.

While the invention that has been illustrated and described is now regarded as the preferred embodiment, the construction is, of course, subject to modification without departing from the spirit and scope of the invention. It is, therefore, not desired to restrict the invention to the particular form of construction illustrated and described, but to cover all modifications that may fall within the scope of the appended claims.

Having thus described the invention, what is claimed and desired to be secured by Letters Patent is:

1. A rope clutch comprising an elongated rigid element provided with a central longitudinal rib on one side thereof, a pair of spaced rollers adjacent one end of said element and on parallel axes transverse to the element and disposed on the side of said element opposite to the rib thereon, and a flexible elongated member attached to said element at the roller carrying end thereof and adapted to be trained alongside of said rib and over the end thereof opposite to said rollers to constitute means for pulling the elongated element in a direction to engage the rollers with opposite sides of a rope while tilting said element relative to the line of the rope.

2. A rope clutch according to claim 1: an eye being provided on said element opposite to and adjacent the rollers, and one end of said flexible member being attached to said eye.

3. A rope clutch according to claim 1: an enlarged undercut projection on the mentioned end of the rib and providing undercut seats for that portion of the flexible member trained thereover.

4. A clutch for a tow rope comprising a cast body having an elongated bar-like flat main portion, a pair of spaced rollers adjacent one end of said main portion and mounted on parallel axes transverse to said main portion, said rollers being disposed on one side of said main portion, a longitudinal rib formed on the opposite side of and along the longitudinal center line of said main portion and extending toward and terminating short of the other end of the main portion, and a cord attached, at one end, to said body at a point opposite to the rollers and adapted to be trained along either side of said rib and over the mentioned end of the rib to constitute means to pull the body in a direction to engage the rollers with opposite sides of a tow rope while tilting said body relative to the line of the tow rope.

5. A clutch for a tow rope comprising a cast body having an elongated bar-like flat main portion, a pair of spaced rollers adjacent one end of said main portion and mounted on parallel axes transverse to said main portion, the rollers being spaced a distance substantially greater than the diameter of a tow rope with which engaged, said rollers being disposed on one side of said main portion, a longitudinal rib formed on the opposite side of and along the longitudinal center line of said main portion and extending toward and terminating short of the other end of the main portion, and a cord attached, at one end, to said body at a point opposite to the rollers and adapted to be trained along either side of said rib and over the mentioned end of the rib to constitute means to pull the body in a direction to engage the rollers with opposite sides of a tow rope while tilting said body relative to the line of the tow rope.

6. A clutch for a tow rope according to claim 4: an enlarged undercut projection on the mentioned end of the rib and providing undercut seats for that portion of the cord trained thereover.

7. A clutch for a tow rope according to claim 4: the rollers having concave peripheral faces for non-slipping engagement with a tow rope.

8. In a rope clutch, an elongated flat body, a longitudinal rib extending from one side of the body, a cord adapted to be trained along either side of said rib and over the end thereof, said end of the rib terminating short of the end of the body and enlarged relative to the rib and means adjacent the other end of said rib for securing the end of a cord and roller means adjacent the cord securing means for engaging a rope.

9. A rope clutch comprising an elongated body member, a pair of spaced rollers adjacent one end of said body member and on parallel axes transverse to the body member, a lug on the opposed side and opposite extremity of said body member, a cord attached at one end to said body at a point opposite to said rollers and adapted to be trained along said body member and over said lug to constitute means for pulling the body member in a direction to engage the rollers with opposite sides of a rope.

10. A clutch for a rope tow according to claim 9 wherein said rollers are spaced from one another a distance substantially greater than the diameter of a tow rope with which the clutch is to be engaged.

11. A rope clutch comprising an elongated rigid element provided with a longitudinal rib on one side thereof, a pair of spaced rollers adjacent one end of said element and on parallel axes transverse to the element and disposed on the side of said element opposite to the rib thereon, and a flexible elongated member attached to said element at an eye disposed on said one side of said member and medially of said axes and adapted to be trained alongside of said rib and over the end thereof opposite to said rollers to constitute means for pulling the elongated element in a direction to engage the rollers with opposite sides of a rope while tilting said element relative to the line of the rope.

References Cited in the file of this patent

UNITED STATES PATENTS

| | | |
|---|---|---|
| 372,306 | Fenton | Nov. 1, 1887 |
| 381,404 | Mayall | Apr. 17, 1888 |
| 2,217,946 | Dondero | Oct. 15, 1940 |
| 2,458,786 | Lagergren | Jan. 11, 1949 |
| 2,473,300 | Puricelli | June 14, 1949 |